UNITED STATES PATENT OFFICE.

CHARLES C. PARSONS, OF BROOKLYN, NEW YORK.

WATER-PROOF COMPOUND OF MANGROVE ROSIN, OR CATIVO, AND CAOUTCHOUC.

SPECIFICATION forming part of Letters Patent No. 278,591, dated May 29, 1883.

Application filed March 12, 1883. (Specimens.)

*To all whom it may concern:*

Be it known that I, CHARLES C. PARSONS, of Brooklyn, New York, have invented a new Water-Proof Compound of Mangrove Rosin, or Cativo, and Caoutchouc, of which the following is a specification.

My invention is based upon my observation of the peculiar adhesiveness and insolubility in water of the sap of the mangrove-tree, sometimes called "mangrove rosin," and known in the United States of Colombia as "cativo," and my discovery that this sap may be combined with caoutchouc in variable proportions, thereby producing permanently-elastic water-proof compounds which are capable of being made into water-proof varnishes by the use of the solvents and additional ingredients ordinarily employed in making so-called "rubber varnishes," and are also capable of conversion into products of less or greater hardness by the ordinary processes of vulcanization, either with or without the addition of the whiting, white lead, or other ingredients usually introduced into ordinary caoutchouc compounds.

It will thus be seen that my new compound, of which cativo is the base, may be treated by the same methods and employed for the same purposes as caoutchouc. The so-called "cativo" is semi-solid at ordinary temperatures, but becomes fluid at about 130° Fahrenheit. In preparing it to serve as the base of my new compound I preferably heat it to a temperature slightly above that of boiling water, for the double purpose of diminishing the strength of its natural odor and separating it from insoluble impurities, which I effect by straining it, while hot, through a bag-filter. When strained and purified it exhibits a clear reddish-brown color. In this condition I mix it with caoutchouc either by using appropriate solvents—such as bisulphide of carbon, naphtha, &c.—or by the employment of hot kneading-rolls, by means of which the mixture is effected mechanically. In the latter case the temperature is elevated until the mixture acquires any desired degree of plasticity.

My new compound may be used as the base for a water-proof varnish, in which case it will be preferable to effect the mixture by dissolving the cativo and caoutchouc in any desired proportions—as, for example, three parts of cativo to one of caoutchouc—in bisulphide of carbon or naphtha, or other solvent, to which may be added linseed-oil, tar, or asphalt, or either of the ingredients ordinarily employed in the manufacture from caoutchouc of so-called "rubber varnishes."

When it is desired to produce a vulcanized product, I prefer to effect the mixture of the cativo and caoutchouc mechanically by the use of the ordinary kneading-rolls, by means of which I at the same time incorporate into the mixture the ingredients or either of the ingredients ordinarily employed in the formation of caoutchouc compounds preparatory to subjecting them to the ordinary processes of vulcanization. Thus I introduce into my compound sulphur or metallic sulphides in variable proportions.

By vulcanizing my compound with, say, five per cent. of sulphur, I obtain a strong elastic product suitable for purposes in which flexibility is required. For special purposes the proportion of sulphur may be largely increased, by means of which the product will acquire additional hardness.

Metallic oxides, carbonates, or other solid substances may be mixed with the compound for increasing the weight or bulk, or for other purposes. Thus a product suitable for application to canvas may be made by using the ingredients in the following proportions, namely: cativo, twenty-three parts; caoutchouc, twenty-three parts; whiting, thirty-six parts; white lead, seven parts; litharge, 5.5 parts; sulphur, 5.5 parts. This formula is given as an example, merely, of one of many formulas which may be usefully employed.

The invention is not limited either to the relative proportions or to the kind of substances which may be incorporated with my compound of cativo and caoutchouc.

It is to be remarked with reference to the mixture made substantially under the formula above set forth that it has sufficient plasticity prior to vulcanization to enable it to be spread upon cloth or to be molded in any desired shape.

The vulcanization of the mixture is effected by subjecting it to a heat of about 275° Fahrenheit. The invention, however, is not limited to vulcanization at this especial temperature, as the temperature may be varied according to circumstances, as is well understood, and any temperature may be used by which the well-known action of vulcanization will result.

I claim as my invention—

1. The new water-proof compound herein described, which consists of a mixture of the sap of the mangrove-tree (sometimes called "mangrove rosin," and also known as "cativo") with caoutchouc in any desired proportions, either by the use of solvents or by mechanical means, as and for the purposes set forth.

2. The herein-described process of making a water-proof compound, which consists in mixing together cativo, caoutchouc, and sulphur or other vulcanizing agent, either with or without additional ingredients, and in then vulcanizing the mixture in the ordinary manner by subjecting it to a suitable temperature for a sufficient length of time.

3. The vulcanized compound herein described, composed, essentially, of cativo, caoutchouc, and sulphur or other vulcanizing agent.

CHARLES C. PARSONS.

Witnesses:
CHARLES T. ROOT,
P. W. OSTRANDER.